United States Patent [19]

Miller

[11] Patent Number: 5,178,672

[45] Date of Patent: Jan. 12, 1993

[54] PRINTING COMPOSITIONS

[75] Inventor: Michael J. Miller, Milton, Canada

[73] Assignee: Canadian Fine Color Company Limited, Toronto, Canada

[21] Appl. No.: 681,968

[22] Filed: Apr. 8, 1991

[51] Int. Cl.$^5$ .................. C09D 11/06; C08L 91/00
[52] U.S. Cl. ................. 106/28 R; 106/27 R; 106/29 R; 106/252; 106/253
[58] Field of Search ............ 106/29, 27, 28, 244, 106/252, 253; 524/594

[56] References Cited

U.S. PATENT DOCUMENTS

| | | | |
|---|---|---|---|
| 2,135,976 | 11/1938 | Koenig | 106/28 |
| 3,297,605 | 1/1967 | Schroeder et al. | 106/252 |
| 3,804,640 | 4/1974 | Buckwalter | 106/28 |
| 3,881,942 | 5/1975 | Buckwalter | 106/29 |
| 4,045,232 | 8/1977 | Parkinson | 106/28 |
| 4,304,601 | 11/1981 | Sharp | 106/29 |
| 4,398,016 | 8/1983 | Homma et al. | 106/29 |

OTHER PUBLICATIONS

Carleton Ellis, "Printing Inks", 1940, p. 7.

*Primary Examiner*—Mark L. Bell
*Assistant Examiner*—Helene Klemanski

[57] ABSTRACT

The present invention is directed to a printing composition, in particular, a paste printing ink vehicle for effecting the setting of a paste printing ink by penetration into a substrate, the vehicle utilizing a vegetable oil fatty acid esterified with a simple alcohol or glycol as a solvent. The use of the esterified fatty acid as a solvent in the printing ink vehicle enables the production of novel petroleum distillate free paste printing inks having characteristics substantially similar to that of conventional petroleum distillate based printing inks.

27 Claims, No Drawings

PRINTING COMPOSITIONS

FIELD OF THE INVENTION

The present invention relates to printing compositions and in particular letterpress and lithographic paste printing ink vehicles which set by penetration and dry by oxidative action and paste printing inks prepared therewith.

BACKGROUND OF THE INVENTION

Printing inks utilize a vehicle as a carrier for the pigment. The vehicle is required to wet the pigment by displacing air at the pigment surface, it is also responsible for getting the pigment to the substrate and holding it there, as well as contributing greatly to the final gloss, setting and various other properties in the ink film. Traditionally, such vehicles have been made from solvents, vegetable oils, resins (both liquid and hard) and may include other components such as co-solvents, rheological modifiers, driers and anti-oxidants. The most commonly utilized vehicle for paste printing inks has been based upon petroleum distillates as the major solvent. It will be immediately apparent that inks produced utilizing petroleum distillates as a solvent suffer from at least two major drawbacks—petroleum is a non-renewable resource and such distillates emit organic vapors during the handling and drying processes. Currently, there is pressure on the printing industry both from regulatory agencies as well as from consumers to reduce both the reliance on a non-renewable resource such as petroleum distillate as well as the potential polluting solvent emissions from such printing vehicles.

There have been attempts to substitute vegetable oils such as linseed oil, soy oil, canola oil, or tung oil as solvents in printing inks in place of the petroleum distillate. Such vegetable oils are a renewable resource and demonstrate substantial reductions in organic vapor emissions. However, it has been found that the use of such vegetable oils restricts the possible formulations of the vehicles because the compatibility and/or the solubility of most hard resins in vegetable oils is much less than that of the more traditional petroleum distillates. Thus, the formulater is restricted in vegetable oil based systems in the possible choices for the components of the vehicle, in particular, the choice of possible hard resins. Vegetable oil based printing inks also tend to be either very slow setting and/or the gloss of the final printed surface is sub-standard when compared to conventional petroleum based systems.

In attempts to overcome the drawbacks of vegetable oil solvents, mixtures of the fatty acids which help make up such vegetables oils have been utilized. While the use of the fatty acids alone increases the solubility of the printing vehicle system tremendously, such printing ink vehicles also display an acid value of over 200 compared with conventional printing ink vehicles based upon petroleum distillate as the solvent which typically have an acid value of less than 25. These high acid value vehicles can cause livering of some types of pigments, a property which is highly undesirable.

SUMMARY OF THE INVENTION

The present invention is directed to a printing composition, in particular, a paste printing ink vehicle for effecting the setting of a paste printing ink by penetration into a substrate, the vehicle utilizing as a solvent, a vegetable oil fatty acid esterified with a simple alcohol or glycol.

The use of the esterified fatty acids as a solvent in the preparation of the printing ink vehicle enables the production of novel petroleum distillate free paste printing inks having characteristics substantially similar to those of conventional petroleum distillate based paste printing ink and the present invention is also directed to such novel paste printing inks.

DETAILED DESCRIPTION OF THE PREFERRED EMBODIMENTS

The present invention is directed to a printing composition and in particular a paste printing ink vehicle which utilizes as the major solvent a vegetable oil fatty acid esterified with a simple alcohol or glycol and paste printing inks prepared therewith.

The term "printing ink vehicle", as will be readily appreciated by those of skill in the art, refers to both an individual printing ink vehicle utilized for formulating a printing ink as well as the non-pigmented components of the formulated printing ink.

The fatty acids which are used in the printing ink vehicles of the present invention are those fatty acids which naturally occur in vegetable oils in particular drying, semi drying or non drying vegetable oils such as soy oil, canola oil, linseed oil, castor oil, dehydrated castor oil, tung oil, corn oil, safflower oil, peanut oil, oiticica oil, perilla oil, sunflower oil, hempseed oil, poppyseed oil and many other more minor oils which can be used in the printing ink and coating industries. The fatty acids typically have carbon chain lengths between C8 and C24 and can include unsaturated and saturated varieties such as for example oleic, linoleic, linolenic, eleosteric, licanic, ricinoleic, erucic, capric, lauric, myristic, palmitic, stearic, arachidic and behenic acids.

The simple alcohol or glycol is preferably a C1 to C10 alcohol or glycol. Preferred such alcohols and glycols include methanol, ethanol, isopropanol, propylene glycol and diethylene glycol. More preferably for processing and environmental reasons, the fatty acids are esterified with a glycol, most preferably propylene glycol.

The esterified fatty acids are produced by standard esterification reactions. In particular, the fatty acids and simple alcohol or glycol are mixed under an inert atmosphere and heated. When esterifying the fatty acids with a glycol, the reaction mixture is preferably heated to 200° to 260° C. An esterification catalyst may be used to enable the reaction to occur at lower processing temperatures particularly when esterifying the fatty acids with an alcohol. Water evolving from the reaction is removed from the system and the reaction allowed to proceed until the mixture has an acid value of 25 or less, more preferably 15 or less, according to the standard acid value test method ASTM D-1639.

In addition to the esterified fatty acid solvents, the printing ink vehicles of the present invention may also contain the typical components of conventional printing ink vehicles. In particular, the vehicles will generally contain a resin as a film forming agent. The resin contributes to the printing ink's tack, film integrity and cohesive properties. Amongst conventional ink resins are rosin derived resins, in particular, esters of rosin and modified rosin, synthetic rosin modified hydrocarbon resins and cyclized rubber. As will be readily appreciated by those of skill in the art, the choice of the particular resin to be utilized in the printing ink vehicle will be made on the basis of the desired properties of the finished product, namely the printed material.

Preferred hard resins for the printing ink vehicles of the present invention are those derived from rosin, in particular, esters of rosin, more particularly, esters of phenolic modified rosin, esters of rosin adducts and esters of dimerized rosin, most particularly esters of phenolic modified rosin. All of these resins are commercially available for example, esters of phenolic modified rosin are available under the trademarks PENTALYN 802A (Hercules Inc.), KRUMBHAAR K-2300 (Lawter International, Inc.) and SETALIN F-340 (Akzo Coatings Inc.). Esters of rosin adducts are available under the trademarks PENTALYN G, PENTALYN X and PENTREX 816 (all from Hercules Inc.) and KRUMBHAAR K-333 (Lawter International, Inc.), while an ester of dimerized rosin is available under the trademark PENTALYN K (Hercules Inc.).

The vehicle may also contain rheological modifiers such as gelling agents to help lower the misting properties of a printing ink and to contribute to a faster setting printing ink as well as controlling the flow properties of the ink. Such gelling agents are typically organometallic compounds of aluminum or polyamide resins. Preferred gelling agents for the vehicle of the present invention are the organometallic compounds of aluminum, in particular, aluminum soaps, aluminum alkoxides or oxyaluminum acylates, most preferably, oxyaluminum acylates such as oxyaluminum octoate. When utilizing a gelling agent in the vehicle, proper manufacturing considerations should be followed. Such considerations include manufacturing under an inert atmosphere, pre-dilution of the gelling agent with the solvent and slow addition of the pre-diluted gelling agent to the agitating vehicle.

Anti-oxidants may be added to the vehicles to retard auto-oxidation to prevent premature skinning of both the vehicle and the printing ink. Preferred such anti-oxidants are butylated hydroxy toluene (BHT) or hydroquinone.

One or more driers may also be added to aid in the oxidation drying of the ink film. Such driers are preferably metal salts of acylates, more preferably metal salts of octoates.

With respect to an individual printing ink vehicle to be utilized in formulating a paste printing ink, the esterified vegetable oil fatty acids will generally comprise about 20 to 80% of the printing ink vehicle, more preferably about 30 to 70%, most preferably about 40 to 60%. The hard resin will generally be present in concentrations from about 15 to 65%, most preferably about 30 to 60%. The printing ink vehicle may also include other solvents such as for example vegetable oils. Such vegetable oils may be present in concentrations up to about 20%, most preferably up to about 10%. Liquid resins, called alkyds, may also be present in the printing ink vehicle. These liquid resins are vegetable oil modified polyesters which may be used to help improve film flexibility and durability. Such alkyds may be present in concentrations up to about 25%, most preferably up to about 10%. When a gelling agent is present in the vehicle, the gelling agent is provided in concentrations up to about 2%, most preferably about 0.5 to 1.5% of the composition.

The paste printing ink according to the invention is prepared in a conventional manner by mixing one or more individual printing ink vehicles and other components at least one of which will contain the esterified fatty acids in suitable percentages.

More particularly, the printing ink vehicle of the formulated printing ink will preferably contain the esterified fatty acids in a concentration range of 15 to 40%, more preferably 20 to 35%, hard resins in a range of 15 to 25%, other solvents such as vegetable oil in a range of 0 to 15%, more preferably 5 to 10%, gelling agents in a range of 0 to 1%, more preferably 0.5 to 1.0%, waxes in a concentration of up to about 5%, more preferably up to 3% and driers in a concentration of up to 5%, more preferably 1 to 3%. The concentration of pigment in the printing ink will generally be in the range of 10 to 30%, more preferably 15 to 20%.

Paste printing inks produced with the printing ink vehicles of the present invention are suitable for use in any of the letterpress and lithographic printing processes. The paste printing inks are particularly suitable for use in offset printing processes which employ conventional lithographic printing plates having ink receptive and water receptive areas. The inks will typically be used for absorbent substrates such as uncoated and coated paper and paper board substrates.

The vehicles of the present invention are utilized for producing paste printing inks which set, then dry, by oxidative action. When such inks are printed onto a porous substrate such as paper, setting occurs as the solvent penetrates the substrate by a wicking action, leaving the solids and in particular the resin and pigment on the surface of the substrate. The ink film then dries through oxidation of the oxidizable groups present in the components of the printing vehicle and ink. Such oxidizable groups include unsaturated bonds such as carbon-carbon double bonds and carbon-oxygen double bonds (aldehydes and ketones) as well as carboxylic acid groups and hydroxyl groups and are typically provided by the hard resin and, if present, the liquid resin and vegetable oils.

In addition to paste printing inks, the vehicle of the present invention may also be utilized in certain finishing compositions such as overprint varnish.

Paste printing inks and other compositions produced utilizing the printing vehicles of the present invention offer numerous benefits including low VOC (Volatile Organic Compound) emitting products, fast setting characteristics, good gloss characteristics, good rub resistance properties, and in particular, improved resin solubility characteristics, thus enabling the formulator to utilize a significantly larger number of hard resins for the vehicle. The vehicles have a low acid value which will not create shelf stability problems, very low water pick-up characteristics, perform like conventional lithographic and letterpress paste printing inks and are derived from a renewable resource.

Preferred embodiments of the present invention will now be described in the following, non-limiting examples.

EXAMPLE 1

Preparation of Vegetable Oil Fatty Acids esterified with glycol for utilization as a solvent is the paste printing ink vehicle Soy oil fatty acids were esterified with propylene glycol by mixing 7.9 kg of soy oil fatty acids and 2.1 kg of propylene glycol in a nitrogen atmosphere under slow agitation. The reactants were heated to 200°–260°

C. and the water evolved was collected and removed from the system. The acid value of the product was checked using the standard acid value test method ASTM D-1639 to confirm a value of 15 or less.

Following the above procedure and utilizing other vegetable oil fatty acids, in addition to the soy oil fatty acids and other simple glycols in addition to propylene glycol, the following esterified fatty acids are prepared: canola oil fatty acids esterified with propylene glycol, linseed oil fatty acid esterified with propylene glycol, soy oil fatty acids esterified with diethylene glycol, canola oil fatty acids esterified with diethylene glycol, and linseed oil fatty acids esterified with diethylene glycol.

EXAMPLE 2

Preparation of Vegetable Oil Fatty Acids esterified with an alcohol for utilization as a solvent in the paste printing ink vehicle A mixture of soy oil fatty acids and 3 molar excess of methanol are refluxed under nitrogen with a trace amount of sulphuric acid until the acid value is below 15. The sulphuric acid is neutralized with a small amount of sodium hydroxide and the excess methanol was evaporated from the reaction chamber.

Following the above procedure utilizing other vegetable oil fatty acids, the following are prepared: canola oil fatty acids esterified with methanol, linseed oil fatty acids esterified with methanol.

EXAMPLE 3

A paste printing ink vehicle

A kettle was charged with 1 kg of heat treated tung oil and 3.97 kg of soy oil fatty acids esterified with propylene glycol prepared in accordance with Example 1. The kettle was heated to 150° C. with mixing under an inert atmosphere and thereafter 4 kg of pentaerythritol ester of phenol aldehyde rosin (hard resin) was added and the temperature of kettle brought up to 180° C. After the solution cleared, the temperature was held at 180° C. for a further 30 minutes. The kettle was then cooled to 130° C. and a pre-mixture of 1 kg of soy oil fatty acids esterified with propylene glycol and 90 g of oxyaluminum octoate gelling agent added very slowly to kettle. 3 g of butylated hydroxy toluene (BHT) is then added to the kettle and allowed to dissolve. The kettle temperature was maintained between 130° C. and 150° C. for thirty minutes and the product filtered through a 50 micron screen or bag as it exited the kettle.

EXAMPLE 4

A cyan process paste printing ink 5.3 kg of the specific printing ink vehicle of Example 2, 800 g of long oil isophthalic-linseed oil alkyd (#7 litho body), 500 g of 100% solids body gum vehicle, 300 g of heat treated tung oil and 500 g of soy oil fatty acids esterified with propylene glycol prepared in accordance with Example 1 were weighed into a clean pot, put on a mixer and mixed well. Thereafter 1.6 kg of Colour Index Pigment Blue 15:3 was added slowly while on the mixer, dispersed well and then 3-roll milled to an NPIRI dispersion of 0/0. The milled ink was placed back on the mixer and 200 g of micronized polyethylene wax, 100 g of micronized polytetrafluoroethylene wax, 80 g of cobalt octoate 6% zirconium octoate 9% mixture, 80 g of manganese octoate 6% and 40 g of basic calcium octoate 10% were added and mixed well. The tack and rheology of the ink were adjusted by adding 500 g of soy oil fatty acids esterified with propylene glycol. The finished ink is dearated over a loose 3-roll mill and then packaged in appropriate containers.

EXAMPLE 5

An Overprint Varnish

A kettle was charged with 1.35 kg of heat treated tung oil, 1.35 kg of #5 litho body long oil soy oil isophthalic alkyd and 2.465 kg of soy oil fatty acids esterified with propylene glycol prepared according to Example 1. The kettle was heated to 150° C. with mixing under an inert atmosphere. 3.385 kg of pentaerythritol ester of maleic modified rosin was added while maintaining the temperature above 150° C. When clear, the temperature was held for a further 30 minutes. The batch was cooled to 130° C. and a pre-mixture of 1 kg of soy oil fatty acids esterified with propylene glycol and 100 g of oxyaluminum octoate gelling agent was added very slowly to the kettle. The temperature was maintained between 130°–150° C. for thirty minutes. Thereafter the batch was cooled to 85° C. and 100 g of micronized polytetrafluoroethylene wax, 100g of cobalt octoate 6% zirconium octoate 9% mixture, 50 g of manganese octoate 6% and 100 g of basic calcium octoate 10% added. The product was filtered through a 50 micron bag, screen or cartridge as it exited the kettle.

Although various preferred embodiments of the present invention have been described herein in detail, it will be appreciated by those skilled in the art, that variations may be made thereto without departing from the spirit of the invention or the scope of the appended claims.

The embodiments of the Invention in which an Exclusive Property or Privilege is claimed are as follows:

1. A paste printing ink vehicle for effecting the setting of a paste printing ink by penetration into a substrate, said vehicle utilizing as a solvent a vegetable oil fatty acid esterified with a simple alcohol or glycol.

2. A printing ink vehicle according to claim 1 wherein the vegetable oil fatty acids are derived from one or more vegetable oils selected from the group consisting of soy oil, canola oil, linseed oil, castor oil, dehydrated castor oil, tung oil, corn oil, safflower oil, peanut oil, oiticica oil, perilla oil, sunflower oil, hempseed oil and poppyseed oil.

3. A printing ink vehicle according to claim 2 wherein the carbon lengths of the fatty acids are in the range of C8 to C24 in length.

4. A printing ink vehicle according to claim 1 wherein the simple alcohol or glycol has a carbon chain length C1 to C10.

5. A printing ink vehicle according to claim 4 wherein the simple alcohol or glycol is selected from the group consisting of methanol, ethanol, isopropanol, propylene glycol and diethylene glycol.

6. A printing ink vehicle according to claim 1 wherein the vegetable oil fatty acids are esterified with a simple glycol.

7. A printing ink vehicle according to claim 6 wherein the glycol is propylene glycol.

8. A printing ink vehicle according to claim 1 wherein the vegetable oil fatty acids are derived from soy oil, linseed oil or canola oil.

9. A printing ink vehicle according to claim 8 wherein the vegetable oil fatty acids are derived from soy oil.

10. A printing ink vehicle according to claim 9 wherein the vegetable oil fatty acids are esterified with a simple glycol.

11. A printing ink vehicle according to claim 10 wherein the glycol is propylene glycol.

12. A printing ink vehicle according to claim 1 further including a hard resin selected from the group consisting of esters of phenolic modified rosin, esters of rosin adducts and esters of dimerized rosin.

13. A printing ink vehicle according to claim 12 wherein said hard resin is an ester of phenolic modified rosin.

14. A printing ink vehicle according to claim 12 further including a gelling agent.

15. A printing ink vehicle according to claim 14 wherein said gelling agent is an oxyaluminum acylate.

16. A paste printing ink vehicle for effecting the setting of a paste printing ink by penetration into a substrate, said vehicle comprising more than 20% and up to 80% by weight of vegetable oil fatty acids esterified with a simple alcohol or glycol as a solvent, about 15 to 65% by weight of an ester of rosin or modified rosin as a hard resin, 0 to about 20% by weight of a vegetable oil as a cosolvent, 0 to about 25% by weight of a vegetable oil modified polyester as an additional film forming agent and 0 to about 2% by weight of an oxyaluminum acylate as a gelling agent.

17. A paste printing ink for use in letterpress or lithographic printing processes, said ink comprising a printing ink vehicle for effecting the setting of said ink by penetration into a substrate and a pigment dispersed in said vehicle, said vehicle utilizing as a solvent, vegetable oil fatty acids esterified with a simple alcohol or glycol.

18. A printing ink according to claim 17 wherein the vegetable oil fatty acids are derived from one or more vegetable oils selected from the group consisting of soy oil, canola oil, linseed oil, castor oil, dehydrated castor oil, tung oil, corn oil, safflower oil, peanut oil, oiticica oil, perilla oil, sunflower oil, hempseed oil and poppyseed oil.

19. A printing ink according to claim 18 wherein the carbon lengths of the vegetable oil fatty acids are in the range of C8 to C24 in length.

20. A printing ink according to claim 19 wherein the simple alcohol or glycol has a carbon chain length C1 to C10.

21. A printing ink according to claim 20 wherein the simple alcohol or glycol is selected from the group consisting of methanol, ethanol, isopropanol, propylene glycol and diethylene glycol.

22. A printing ink according to claim 17 wherein the vegetable oil fatty acids are esterified with a simple 23. A printing ink according to claim 22 wherein the glycol is propylene glycol.

24. A printing ink according to claim 17 wherein the vegetable oil fatty acids are derived from soy oil, linseed oil or canola oil.

25. A printing ink according to claim 24 wherein the vegetable oil fatty acids are derived from soy oil.

26. A printing ink according to claim 25 wherein the vegetable oil fatty acids are esterified with a simple glycol.

27. A printing ink according to claim 26 wherein the glycol is propylene glycol.

* * * * *